United States Patent
Sasaki et al.

(10) Patent No.: US 7,496,287 B2
(45) Date of Patent: Feb. 24, 2009

(54) IMAGE PROCESSOR AND IMAGE PROCESSING PROGRAM

(75) Inventors: Masaaki Sasaki, Hachioji (JP); Shinichi Matsui, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 484 days.

(21) Appl. No.: 11/313,072

(22) Filed: Dec. 20, 2005

(65) Prior Publication Data
US 2007/0014554 A1 Jan. 18, 2007

(30) Foreign Application Priority Data
Dec. 24, 2004 (JP) .............................. 2004-374269

(51) Int. Cl.
G03B 17/00 (2006.01)

(52) U.S. Cl. .................. 396/54; 396/55; 348/208.1; 348/208.6

(58) Field of Classification Search ................ 396/52, 396/54, 55; 348/208.1, 208.9, 239, 218.1, 348/208.6
See application file for complete search history.

(56) References Cited

U.S. PATENT DOCUMENTS

| | | | |
|---|---|---|---|
| 5,729,290 A | 3/1998 | Tokumitsu et al. | |
| 6,522,785 B1 * | 2/2003 | Kondo et al. | 382/254 |
| 2003/0090593 A1 | 5/2003 | Xiong | |
| 2004/0238718 A1 | 12/2004 | Washisu | |
| 2004/0239775 A1 | 12/2004 | Washisu | |
| 2005/0018927 A1 | 1/2005 | Manabe | |

FOREIGN PATENT DOCUMENTS

| | | |
|---|---|---|
| EP | 1501288 A2 | 1/2005 |
| GB | 2316255 A | 2/1998 |
| JP | 2003-134385 A | 5/2003 |

* cited by examiner

Primary Examiner—William B. Perkey
(74) Attorney, Agent, or Firm—Frishauf, Holtz, Goodman & Chick, P.C.

(57) ABSTRACT

Feature points are extracted from an image of a plurality of frames. A blurring direction component of a previous frame image is judged from motion vectors of the next frame image acquired with reference to feature points of the extracted previous frame image. Images of the same blurring direction are selected and grouped from the image of a plurality of frames based on that judgment result. After performing position compensation, an additive composite of a grouped composite image is created for each group so that feature points conform to grouped images. Subsequently, inverse transform filter processing is applied to the grouped composite image data and hand shake compensation by group is accomplished which compensates the blurring direction component matched to a group. Upon position compensation, an additive composite is generated of a hand shake compensated image so that feature points of each grouped composite image conform to hand shake compensation.

4 Claims, 7 Drawing Sheets

IMAGE PROCESSOR AND IMAGE PROCESSING PROGRAM

CROSS-REFERENCE TO RELATED APPLICATION

This application is based upon and claims the benefit of priority from the prior Japanese Patent Application No. 2004-374269, filed Dec. 24, 2004, the entire contents of which is incorporated herein by reference.

BACKGROUND OF THE INVENTION

1. Field of the Invention

The present invention relates to a suitable image processor and associated image processing program, for example, used in a digital camera or a digital video camera.

2. Description of the Related Art

Conventionally, technology which performs hand shake compensation by image processing is known in the field of digital cameras or digital video cameras. "Hand shake" is also commonly referred to as "camera shake" for camera movement during exposure.

In the conventional prior art, for example, Japanese Laid-Open (Kokai) Patent Application No. 2003-134385 titled "IMAGE SYNTHESIZING DEVICE" discloses a device in which a plurality of images with different light exposures are captured. Within these images, one motion vector as an entire image is detected between one image and the other images. Based on the detected motion vector, the process judges whether or not there is any blurring in the image (motion blur) caused by "object blur" or "hand shake." In a case of "hand shake," after alignment of each consecutive image, hand shake compensation is performed and superimposed into one image so that the position displacement of an object, background, etc. corresponding to displacement of the angle of view resulting from "hand shake" can be offset.

Apart from that, in order to accomplish hand shake compensation which superimposes each consecutive image so that the position displacement of an object, background, etc. can be offset, every single image must be captured as a short-time exposure image which does not include hand shake and have a sharpness level which can recognize object and background displacement. Although these requirements are compatible when the photographic environment is sufficiently bright, but either one will be abandoned when the light intensity is insufficient.

Besides, as another method of handshake compensation, there is also technology that makes blurring less noticeable by applying an inverse transform filter to a blurred image. Although, it is possible to apply such technology to each of the above-mentioned brief exposure images, this technique also has a problem.

In the one hand, images with insufficient exposure as mentioned above include a lot of carried noise from the image pickup device. On the other hand, an inverse transform filter for hand shake compensation generally has the characteristic of emphasizing generally high frequency regions. This results in the fact that the noise components in images are emphasized. Consequently, the inverse transform filter does not provide a fundamental solution.

SUMMARY OF THE INVENTION

The present invention has been made in view of such a situation described above. Accordingly, an object of the present invention is to provide an image processor and associated image processing program in which hand shake compensation can be accomplished even if an image is photographed in an environment requiring a long-time exposure, for example, at night, in a dark area indoors, etc.

In order to achieve the above-mentioned object, the present invention comprises a grouping means for determining a blurring direction component for each image from movement of feature points common to a plurality of consecutive images and for providing groups of images respectively having the same blurring direction component; a group composite image generation means for generating a grouped composite image for each of the groups of images, wherein position compensation is performed and superimposed so that the feature points of images respectively conform to grouping by the grouping means; and a compensated image generation means for compensating the blurring direction component corresponding respectively to the grouped composite image for each of the groups of images generated by the group composite image generation means and generating a hand shake compensated image, wherein position compensation is performed and superimposed so that the feature points of each grouped composite image respectively conforms to position compensation.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

Hereinafter, an embodiment of the present invention will be explained with reference to the drawings.

A. Configuration

A-1. Entire Configuration

Figure 1:
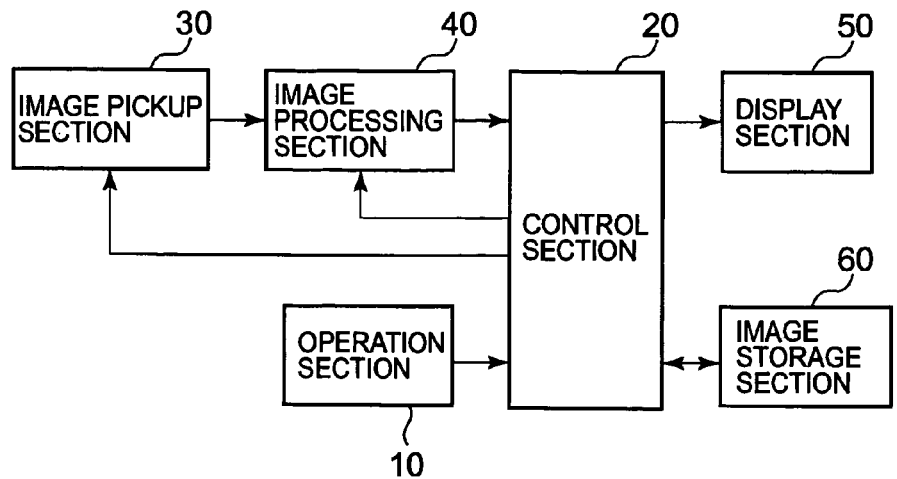
FIG. 1 is a block diagram showing the configuration of one preferred embodiment of the present invention.
Figure 2A:
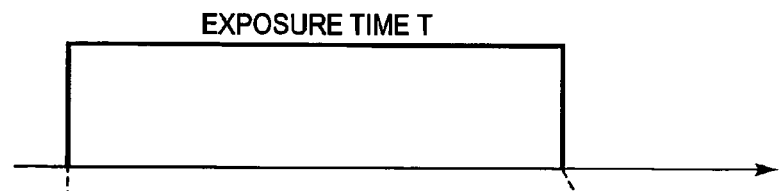
FIGS. 2A~2B are diagrams for explaining exposure form in the case of hand shake prevention photography.
Figure 2B:
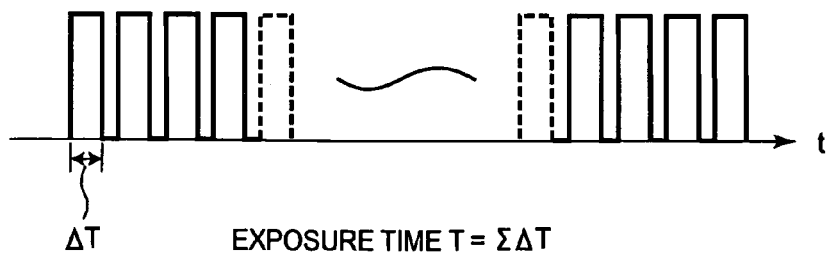

FIG. 1 is a block diagram showing the configuration of one preferred embodiment of the present invention. FIGS. 2A~2B are diagrams for explaining exposure form in the case of hand shake (camera shake) prevention photography. Referring now to FIG. 1, an operation section 10 contains various operation keys, such as a power switch, shutter key, etc. and the key event corresponding to a keystroke operation is generated and supplied to a control section 20. The control section 20 is configured with a Central Processing Unit (CPU), etc. which generates a control signal for controlling each section depending on the key event inputted from the operation section 10. An image pickup section 30 has an optical system comprising an image pickup lens group and a shutter mechanism having a color image sensor, for example, a Charged Coupled Device (CCD), etc. which images an object image and generates a color image signal in a predetermined frame period. The acquired image signal picked up according to shutter speed or exposure value that is set up based on a supplied control signal is outputted from the control section 20.

When photographing in an environment requiring a long-time exposure, for example, at night, in a dark area indoors, etc, hand shake prevention photography is performed (refer to FIG. 2B) in which the image pickup section 30 repeats a short-time exposure $\Delta T$ N times and consecutively generates an image signal of N frames as opposed to a case of normal photography exposure time as seen in FIG. 2A. The total exposure time T in the case of hand shake prevention photography conforms to the exposure time T in the case of normal photography given that the sum total $\Sigma\Delta T$ represents the exposure time $\Delta T$ per one frame. Such hand shake prevention photography will be described later on.

An image processing section 40 converts the image signal inputted from the image pickup section 30 into image data composed of a luminance component and a color difference component, as well as applies various types of image processing according to control signals supplied from the control section 20. The various types of image processing mentioned here includes, for example, white balance correction, image quality adjustment processing for sharpness, contrast, etc., corresponding to the photography mode selected by the menu key operation of the operation section 10, and hand shake compensation processing described later. Hand shake compensation processing which the image processing section 40 executes will be described later. A display section 50 displays a display screen of the image data which the image processing section 40 outputs under the control of the control section 20 or displays a screen display of the image data stored in an image storage section 60. The image storage section 60 records the image data which the image processing section 40 outputs under the control of the control section 20.

A2. Configuration of the Image Processing Section 40

Figure 3:
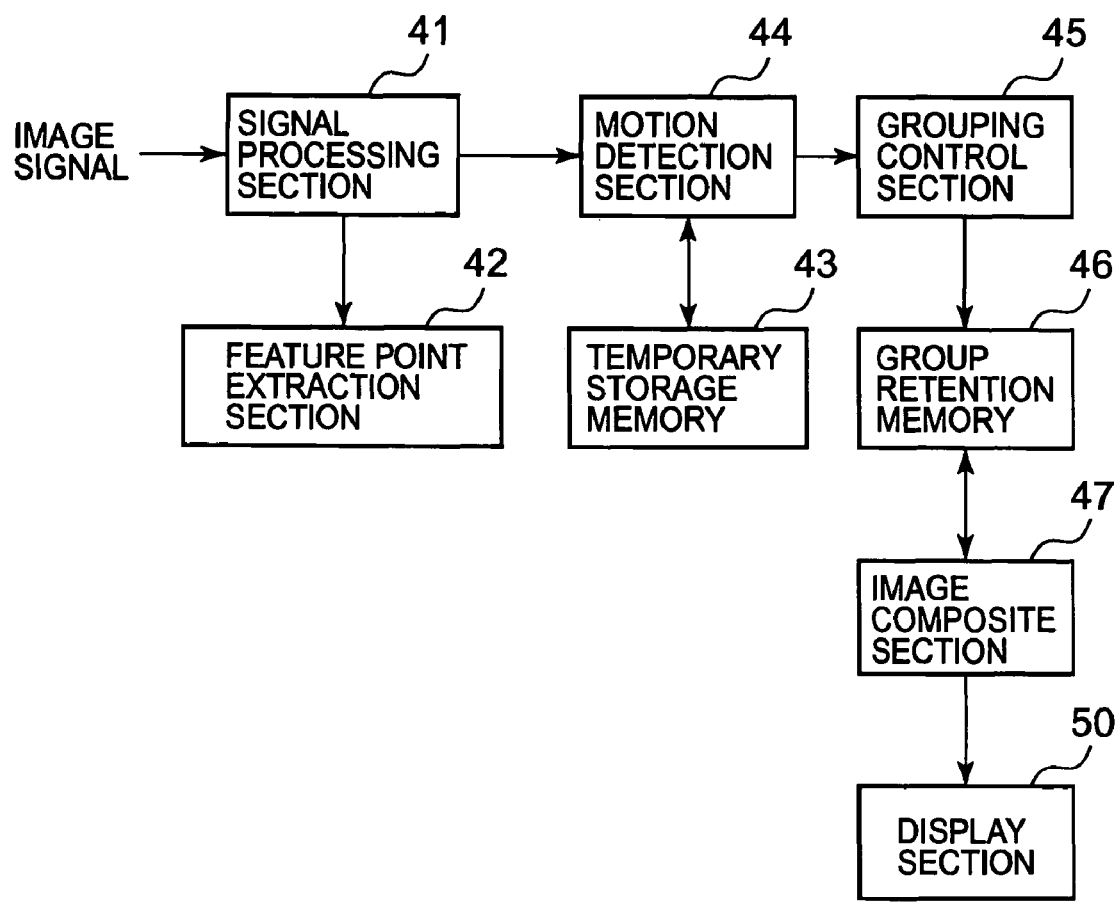
FIG. 3 is a block diagram showing the configuration of an image processing section 40.
Figure 4A:
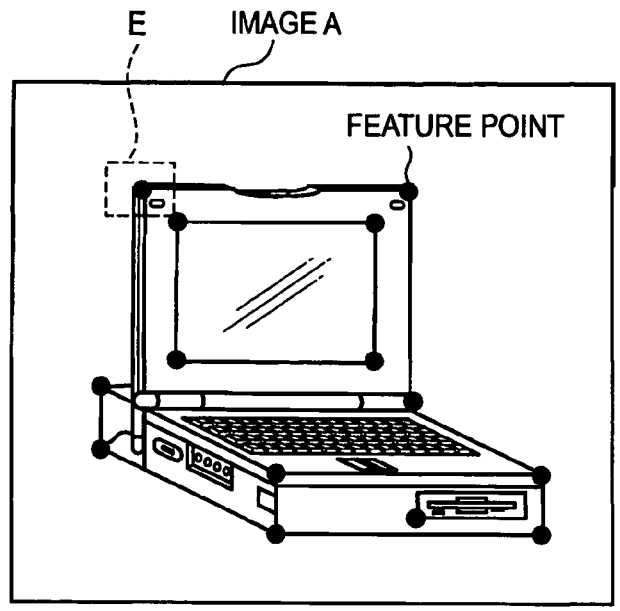
FIGS. 4A~4B are diagrams for explaining feature point extraction.
Figure 4B:
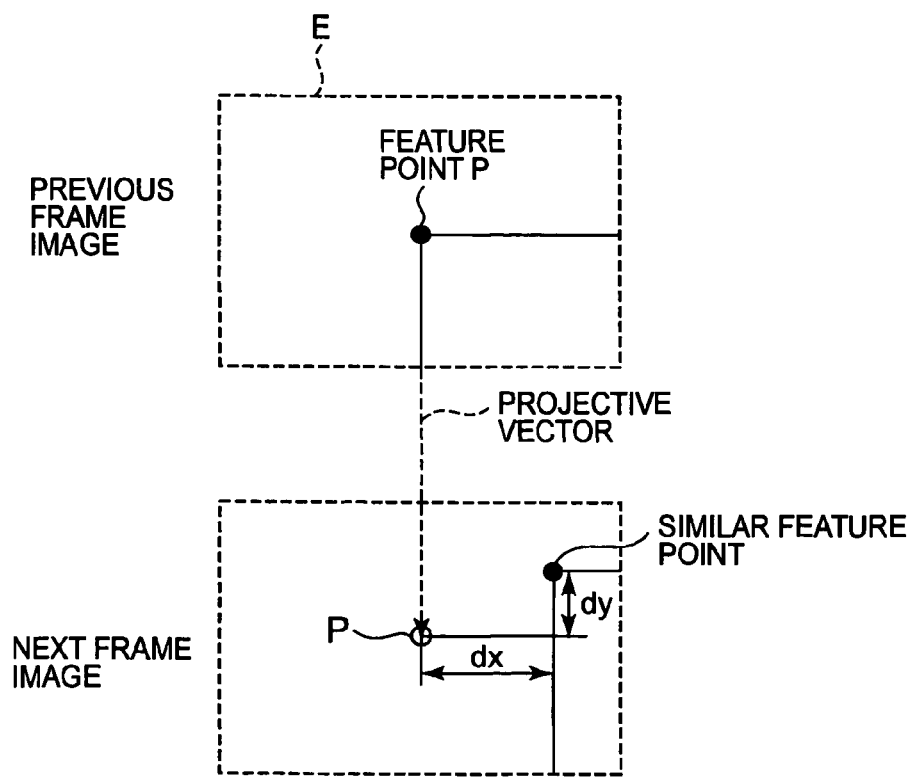
Figure 5:
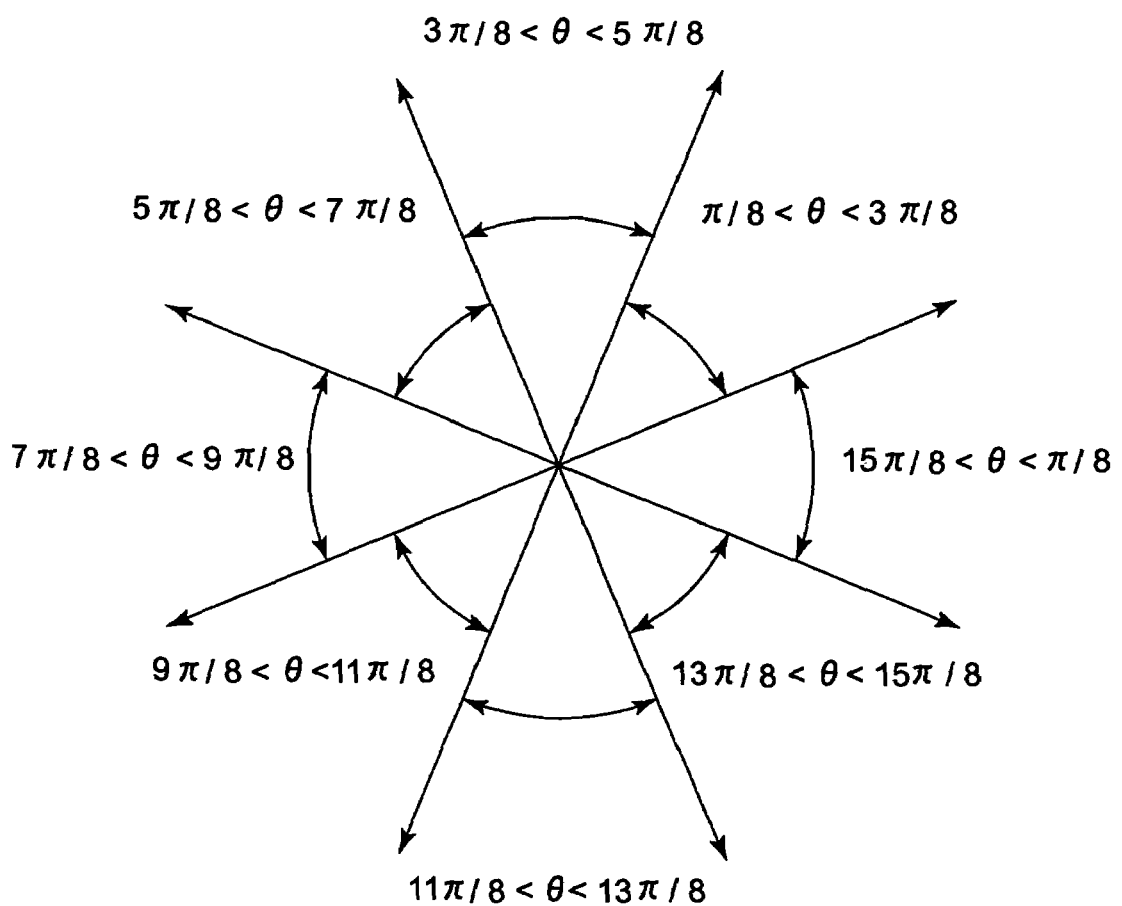
FIG. 5 is a diagram showing an example of grouping performed by a grouping control section 45.

FIG. 3 is a block diagram showing the configuration of the image processing section 40. FIGS. 4A~4B are diagrams for explaining feature point extraction. FIG. 5 is a diagram showing an example of grouping performed by a grouping control section 45. Beginning with FIG. 3, the configuration shows the functional elements corresponding to hand shake compensation processing executed by the image processing section 40. A signal processing section 41 converts the image signal inputted from the image pickup section 30 to image data composed of a luminance component and a color difference component. When photographing in an environment requiring a long-time exposure, for example, at night, in a dark area indoors, etc, as seen in FIG. 2B, N frames of image data are consecutively supplied to the signal processing section 41 from the image pickup section 30.

A feature point extraction section 42 respectively extracts a plurality of feature points from N respective frames of image data consecutively supplied from the signal processing section 41. Feature points refer to pixels (picture elements) where the surrounding luminosity or color varies greatly. Specifically, as seen in FIG. 4A for example, supposing that the frame image supplied from the image pickup section 30 is image A with a notebook PC photographed as the object. In this image A, the edge parts, etc. of the object are extracted as feature points (illustrated by black dots in the drawing). The extracted feature points have parameters, such as luminosity, color, etc. and are treated as data with independent attributes, respectively.

A temporary storage memory 43 temporarily stores a plurality of feature points extracted by the feature point extraction section 42 and the image data of frame extracted feature points as a set. This temporary storage can be separate memory comprised in the image processing section 40 and does not matter as to style in using a portion of the memory area containing the image storage section 60 mentioned above.

A motion detection section 44 detects motion vectors of the next frame image (also known as the "future frame") outputted from the signal processing section 41 with reference to the feature points of the previous frame image stored in the temporary storage memory 43 and determines in which direction the previous frame is blurred relative to the next frame image.

As seen in FIG. 4B, the motion vector detection is a process of calculation for a difference (dx, dy) between a similar feature point on a next frame image and a feature point P in a previous frame image. Namely, in the case where the similar feature point which has the same attribute with the feature point P exists in a predetermined range from a projected position of a feature point P on a next frame. In a case where a similar feature point corresponding to a projected position cannot be retrieved, a motion vector is detected using other of feature points. In the motion detection section 44, the determined "blurring direction" is appended as an attribute to the image data of the previous frame image read out from the temporary storage memory 43 and output to the next stage of a grouping control section 45.

The grouping control section 45 performs grouping with reference to the attribute concerning the image data of the frame assigned a "blurring direction" as an attribute and outputted from the motion detection section 44. In the preferred embodiment of the present invention, in order to achieve simplification of the description, the blurring direction $\theta$ as seen in FIG. 5 is divided into four groups of:

$\Pi/8<\theta<3\Pi/8$ -OR- $9\Pi/8<\theta<11\Pi/8$, $3\Pi/8<\theta<5\Pi/8$ -OR- $11\Pi/8<\theta<13\Pi/8$, $5\Pi/8<\theta<7\Pi/8$ -OR- $13\Pi/8<\theta<15\Pi/8$, and $15\Pi/8<\theta<\Pi/8$ -OR- $7\Pi/8<\theta<9\Pi/8$.

A group retention memory 46 comprises memory areas 1~4 which respectively correspond to the above-mentioned four groups and performs group registration in the memory areas corresponding to image data in divided groups by the grouping control section 45. This group retention memory 46 can be separate memory comprised in the image processing section 40 and does not matter as to style in using a portion of the memory area containing the image storage section 60 mentioned above.

When a new image data is registered in the group retention memory 46, the image composite section 47 composes a new grouped composite image data by adding previously registered image data and new image data after performing position compensation to match positions of feature points of the previously registered image data with positions of feature points of the new image data. Accordingly, in the situation of grouping all N frames of each image data consecutively photographed and group registration has been performed in the group retention memory 46, one grouped composite image data will be stored at a maximum in the memory areas respectively corresponding to each group.

Additionally, in the image composite section 47, when grouping all N frames of each image data consecutively photographed and group registration has been performed in the group retention memory 46, the grouped composite image data for each group is read out from the respective groups in the group retention memory 46. Subsequently, inverse transform filtering of the direction corresponding to the read out grouped composite image data is applied and hand shake compensation by group is performed. Hereinafter, an outline of the inverse transform filtering performed by the image composite section 47 will be explained.

Now, for example, consider that a feature point (x0, y0) is to be compensated. As mentioned above, since the image composite section 47 created one grouped composite image data for each blurring direction. A current x-axis can be set for the blurring direction and a current orthogonal y-axis can be set at the feature point (x0, y0) as the origin. In this manner, since the same processing is performed relative to each y value, an image can be expressed with one variable x. With an unblurred image represented by f(x) a blurred image represented by g(x) and the blurring condition (PSF—Point Spread Function) of an image represented by h(x), these can be expressed with the following formula (1):

$$g(x)=f(x)*h(x) \quad (1)$$

Here, * indicates convolution operation.

Then, when performing Fourier transform of f(x), g(x) and h(x) represented by F, G, H, respectively, the above-mentioned formula (1) can be expressed with the following formula (2):

$$G(u)=F(u) \times H(u) \quad (2)$$

Accordingly, dividing both sides of the above-stated formula (2) by H(u) as expressed with simple multiplication becomes the following formula (3):

$$F(u)=G(u)/H(u) \quad (3)$$

When h(x) which represents the blurring condition (PSF) of an image is known, as a result of the above-mentioned (1)~(3) formulas dividing the Fourier transform blurred image G(u) by the Fourier transform blurring condition H(u), an unblurred image f(x) can be acquired by performing this inverse Fourier transform. Thereby, the inverse transform filter M (u) can be expressed with the following formula (4):

$$M(u)=1/H(u) \quad (4)$$

Next, h(x) will be calculated in detail. For example, a case is presumed in which a blurred image to be compensated contains the blurred width of five pixels. Under the assumption that hand shake speed was constant during the time of exposure, a given one pixel of an image data can be considered as an average value of a five pixel portion of an unblurred image.

Specifically, the blurring condition h(x) becomes [⅕] in the case of |x|<2.5 and [0] in the case of |x|≧2.5. Such an inverse transform filter M(u) can be calculated by substituting the blurring condition h(x) characteristic in the above-mentioned formula (1). In addition, this inverse transform filter M(u) ideally does not take noise mixture into consideration. Actually, the image restoration method by well-known Wiener filtering can be used.

As mentioned above, since one grouped composite image data is created for each blurring direction by the image composite section 47, the CCD noise, etc. superimposed on the image data is equalized and the Signal-to-Noise (S/N) ratio is improved. Furthermore, as a direct result of executing inverse filter processing using the above-mentioned inverse transform filter M(u), hand shake compensation can be effectively performed.

In this manner, with regard to the grouped composite image data for each group by which inverse transform filtering has been performed, after accomplishing position compensation the image composite section 47 generates additive composite hand shake compensated image data so that the respective feature points can be superimposed. Subsequently, an image display is effected on a display section 50 via the control section 20 (refer to FIG. 1) or the image data is stored in the image storage section 60.

B. Operation

Figure 6:
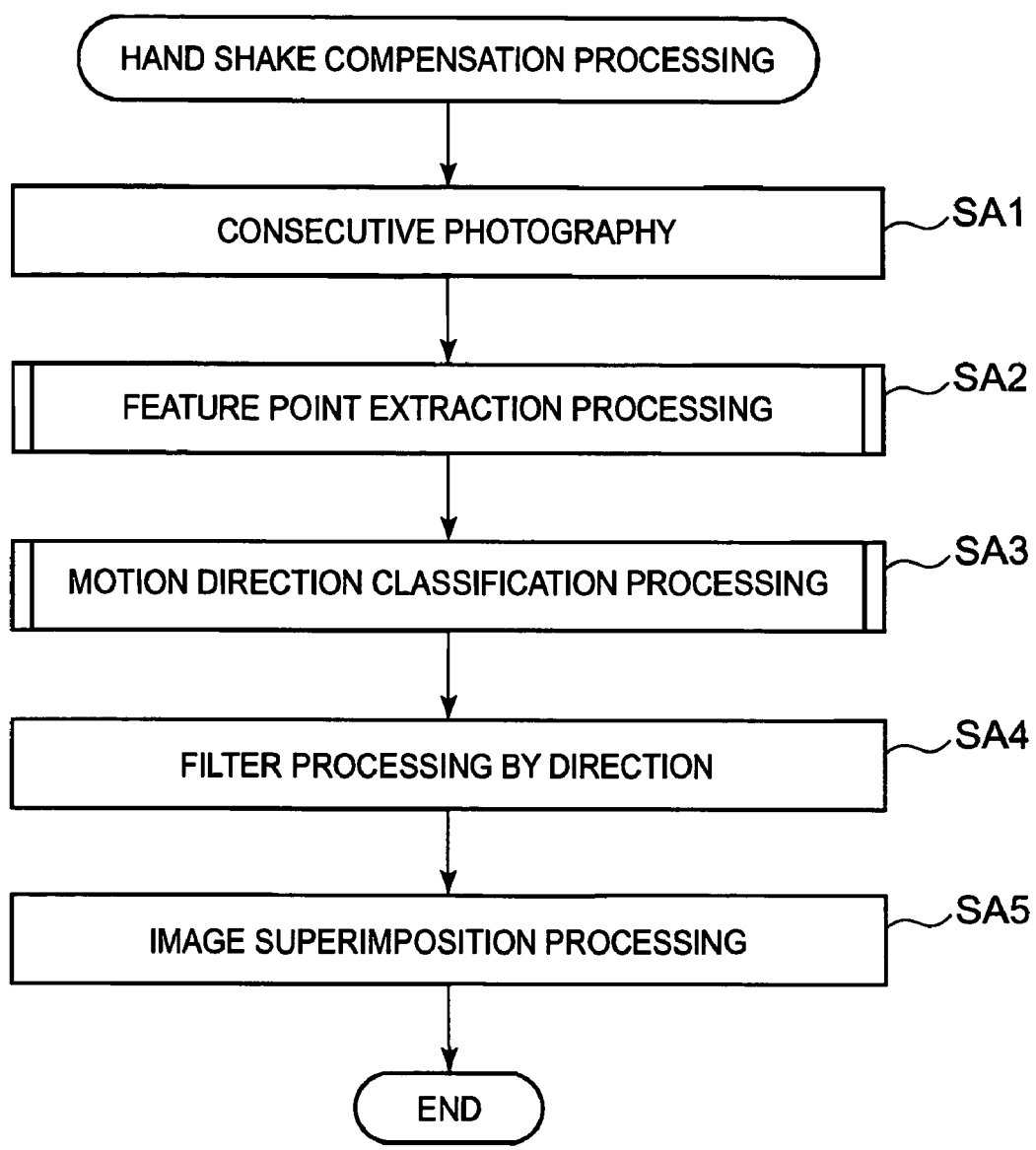
FIG. 6 is a flow chart showing operation of hand shake compensation processing.
Figure 7:
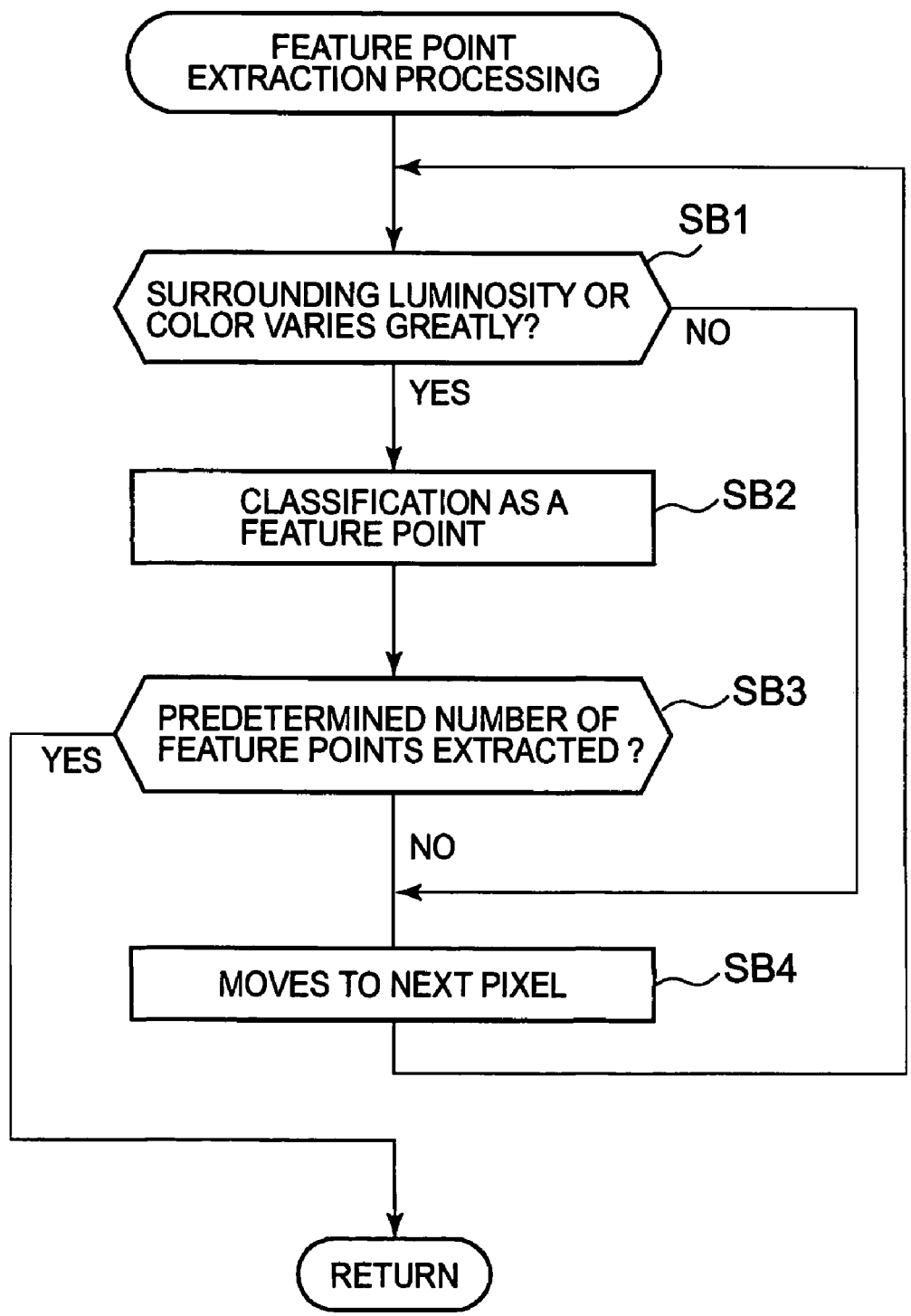
FIG. 7 is a flow chart showing operation of feature point extraction processing.
Figure 8:
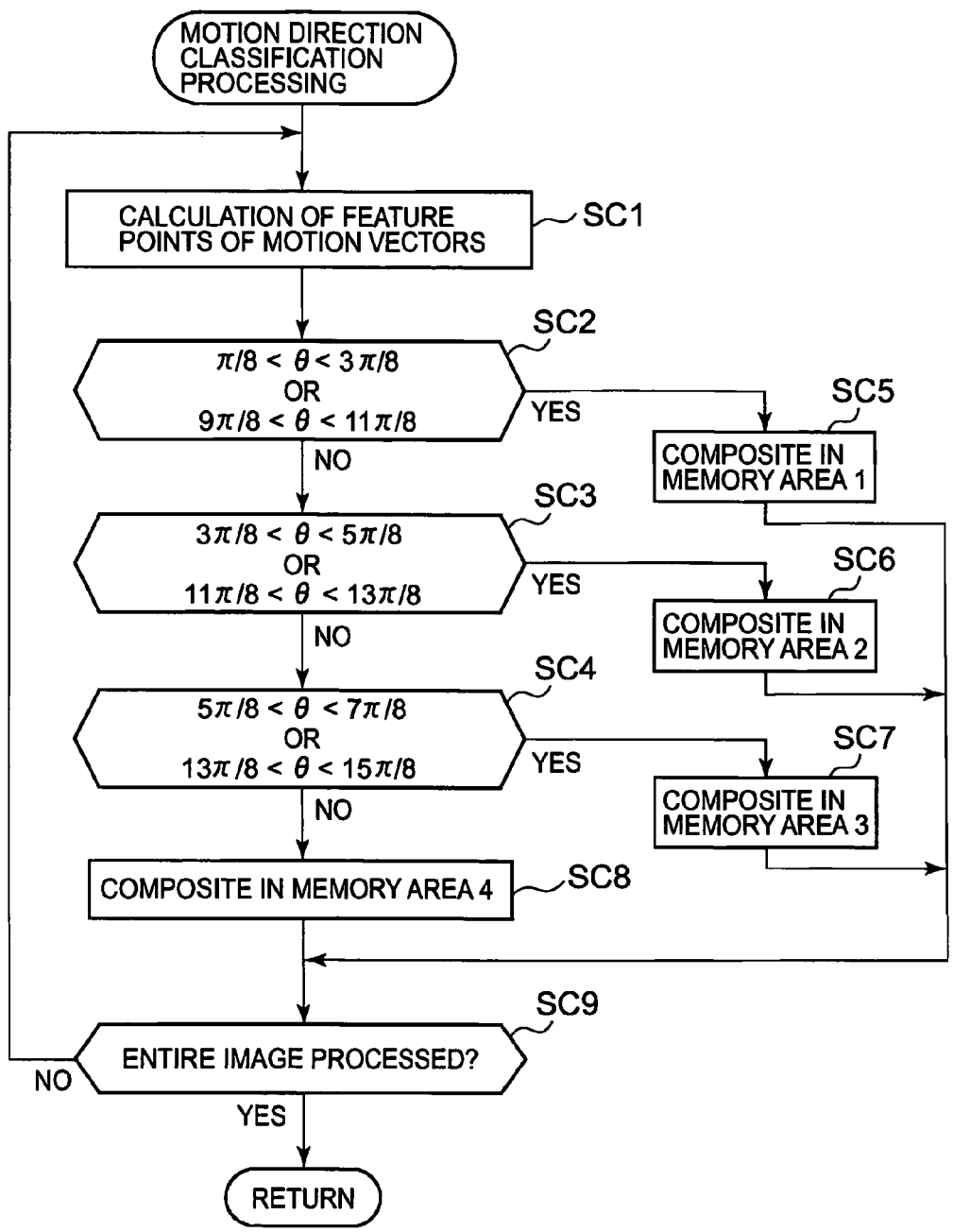
FIG. 8 is a flow chart showing operation of motion direction classification processing.

With reference to FIGS. 6~8, operation of the hand shake compensation processing executed in the preferred embodiment according to the above-mentioned configuration will be explained. FIG. 6 is a flow chart showing the outline operation of hand shake compensation processing which is executed by the image processing section 40. FIG. 7 is a flow chart showing operation of feature point extraction processing which is executed by the feature point extraction section 42. FIG. 8 is a flow chart showing operation of motion direction classification processing which is executed by the motion detection section 44, grouping control section 45 and the image composite section 47.

Corresponding to the instructions from the control section 20, handshake prevention photography (refer to FIG. 2A and FIG. 2B) is performed in which the image pickup section 30 repeats a short-time exposure ΔT N times and consecutively generates an image signal of N frames. As illustrated in FIG. 6, the image processing section 40 applies hand shake compensation processing relative to the image signal of N frames generated by the hand shake prevention photography.

Specifically, first at Step SA1, the image signal inputted from the image pickup section 30 is converted into image data. Subsequently, at Step SA2, feature point extraction processing which extracts a plurality of feature points from the inputted image data is executed. The feature point extraction processing configuration from Steps SB1~SB4 are shown in FIG. 7.

At Steps SB1, SB4 shown in FIG. 7, each pixel of the inputted frame image is sequentially scanned and pixels where the surrounding luminosity or color varies greatly are retrieved. When pixels applicable to these conditions are retrieved, the judgment result of Step SB1 becomes "YES." Processing advances to Step SB2 and the applicable pixels are extracted as feature points. The extracted feature points contain parameters, such as luminosity, color, etc. and are stored with the image data for extraction as data with independent attributes, respectively, in the temporary storage memory 43.

Next, at Step SB3, the process judges whether or not extraction of a predetermined number of feature points has been completed from the image data of the frames intended for extraction. If extraction of a predetermined number of feature points has not been completed, the judgment result becomes "NO"whereby the process advances to Step SB4 and continues pixel scanning. Conversely, when extraction of a predetermined number of feature points has been completed, the judgment result becomes "YES" and this processing will be completed. Then, the motion direction classification processing shown in FIG. 8 will be executed via Step SA3 as shown in FIG. 6.

When motion direction classification processing is executed, processing advances to Step SC1 shown in FIG. 8. Motion vectors of the next frame image will be detected with reference to feature points of the previous frame image stored in the temporary storage memory 43. Processing then determines in which direction the previous frame image is blurred as opposed to the next frame image. The determined "blurring direction" is appended as an attribute to the image data of the previous frame image read out from the temporary storage memory 43 and outputs to the next stage of the grouping control section 45.

The grouping control section 45 executes Steps SC2~SC4 and performs group registration in the group retention memory 46 of the image data corresponding to the blurring direction E with reference to the attribute appended to the image data. Specifically, when the blurring direction θ is Π/8<θ<3Π/8 -OR- 9Π/8<θ<11Π/8, the judgment result of Step SC2 becomes "YES" and group registration of the applicable image data will be stored in the memory area 1 of the group retention memory 46.

When the blurring direction θ is 3Π/8<θ<5Π/8 -OR- 11Π/8<θ<13Π/8, the judgment result of Step SC3 becomes "YES" and group registration of the applicable image data will be stored in the memory area 2 of the group retention memory 46.

When the blurring direction θ is 5Π/8<θ<7Π/8 -OR- 13Π/8<θ<15Π/8, the judgment result of Step SC4 becomes "YES" and group registration of the applicable image data will be stored in the memory area 3 of the group retention memory 46.

When the blurring direction θ is 15Π/8<θ<Π/8 -OR- 7Π/8<θ<9Π/8, each judgment result of the Steps SC2~SC4 becomes "NO" and group registration of the applicable image data will be stored in the memory area 4 of the group retention memory 46.

The image composite section 47 executes Steps SC5~SC8. Specifically, when new image data is registered in the group retention memory 46, the image composition section 47 composes a new grouped composite image data by adding previously registered image data and new image data after performing position compensation to match positions of feature points of the previously registered image data with positions of feature points of the new image data. Then, in the situation of grouping all N frames of each image data consecutively photographed and group registration has been performed in the group retention memory 46, the judgment result of Step SC9 becomes "YES" and this processing will be completed. Next, filter processing by blurring direction of Step SA4 as shown in FIG. 6 will be executed.

When grouping all N frames of each image data consecutively photographed and group registration has been performed in the group retention memory 46, the image composite section 47 reads out the grouped composite image data for each group from the respective groups in the group retention memory 46. Subsequently, processing applies inverse filter processing corresponding to the grouped composite image data and performs hand shake compensation by group. Afterwards, processing advances to Step SA5 which relates to the grouped composite image data for each group by which inverse transform filtering has been performed. After accomplishing position compensation, the image composite section 47 generates additive composite hand shake compensated image data so that the respective feature points can be superimposed.

As described above, in the preferred embodiment of the present invention, feature points are extracted respectively from an image of a plurality of frames acquired by repeated short-time exposures, motion vectors of the next frame are detected with reference to the feature points of an extracted previous frame image and the blurring direction of the previous frame image is judged from the detected motion vectors to provide a judgment result. Then, while selecting and grouping images of the same blurring direction from the plurality of images based on this judgment result, a group composite image is created for each group upon position compensation being performed and superimposed so that the feature points of images respectively conform to grouping. Subsequently, inverse transform filter processing is applied to grouped composite image data and hand shake compensation by group is accomplished, which compensates the blurring direction component matched to a group. A hand shake compensated image is generated after performing position compensation and superimposed so that the feature points of each grouped composite image respectively conform to hand shake compensation.

Therefore, the above noise rejection (noise equalization) can be performed without lessening the accuracy of the direction which does not generate blurring by the arranged grouping of the blurring direction. Also, fade correction becomes possible without exerting an adverse influence to the direction which does not generate blurring by using an inverse transform filter that is effective only in the required direction. Furthermore, as a direct result of being able to compensate underexposure without impairing visibility by superimposing images after effecting noise rejection and fade correction, hand shake compensation can be accomplished even if an image photographed in an environment requiring a long-time exposure, for example, at night, in a dark area indoors, etc.

Lastly, although the processing program for a digital camera which is one of the preferred embodiments of the present invention is stored in a digital camera memory (for example, ROM, etc.), this processing program is stored on a recording medium. In the case of performing, such as manufacture, sale, etc., only the program itself must be protected. In such a situation, protection of the program becomes the form of a recording medium which stores the image processing program.

While the present invention has been described with reference to the preferred embodiments, it is intended that the invention be not limited by any of the details of the description therein but includes all the embodiments which fall within the scope of the appended claims.

What is claimed is:

1. An image processor, comprising:
grouping means for determining a blurring direction component for each image from movement of feature points common to a plurality of consecutive images and for providing groups of images respectively having the same blurring direction component;
group composite image generation means for generating a grouped composite image for each of the groups of images, wherein position compensation is performed and superimposed so that the feature points of images respectively conform to grouping by the grouping means; and
compensated image generation means for compensating for the blurring direction component corresponding respectively to the grouped composite image for each of the groups of images generated by the group composite image generation means and generating a hand shake compensated image, wherein position compensation is performed and superimposed so that the feature points of each grouped composite image respectively conform to position compensation.

2. An image processor, comprising:
extraction means for extracting feature points from a plurality of consecutive frame images that constitute exposures repeatedly imaged at a predetermined time interval;

determination means for detecting motion vectors of a frame image with reference to the feature points of a previous frame image extracted by the extraction means and for determining a blurring direction component of each of the frame images by repeating an operation to determine the blurring direction component of the previous frame image from the detected motion vectors;

grouping means for selecting and grouping images to provide groups of images respectively having the same blurring direction component with reference to the blurring direction component of each of the frame images determined by the determination means;

group composite image generation means for generating a grouped composite image for each of the groups of images, wherein position compensation is performed and superimposed so that the feature points of images respectively conform to grouping by the grouping means;

compensation means for applying inverse transform filtering and performing hand shake compensation according to the groups of images, which compensates for the blurring direction component corresponding respectively to each grouped composite image generated by the group composite image generation means; and compensated image generation means for generating a hand shake compensated image, wherein position compensation is performed and superimposed so that the feature points of each grouped composite image respectively conform to hand shake compensation by the compensation means.

3. A computer-readable storage medium having an image processing program stored thereon that is executable by a computer to cause the computer to perform a process comprising:

group processing for determining a blurring direction component of each image from movement of feature points common to a plurality of consecutive images and for providing groups of images respectively having the same blurring direction component;

group composite image generation processing for generating a grouped composite image for each of the groups of images, wherein position compensation is performed and superimposed so that the feature points of images respectively conform to grouping by the group processing; and compensated image generation processing for compensating the blurring direction component corresponding respectively to the grouped composite image for each of the groups of images generated by the group composite image generation processing and generating a hand shake compensated image, wherein position compensation is performed and superimposed so that the feature points of each grouped composite image respectively conform to position compensation.

4. A computer-readable storage medium having an image processing program stored thereon that is executable by a computer to cause the computer to perform a process comprising:

extraction processing for extracting feature points from a plurality of consecutive frame images that constitute exposures repeatedly imaged at a predetermined time interval;

determination processing for detecting motion vectors of a frame image with reference to the feature points of a previous frame image extracted by the extraction processing and for determining a blurring direction component of each of the frame images by repeating an operation to determine the blurring direction component of the previous frame image from the detected motion vectors;

group processing for selecting and grouping images to provide groups of images respectively having the same blurring direction component with reference to the blurring direction component of each of the frame images determined by the determination processing;

group composite image generation processing for generating a grouped composite image for each of the groups of images, wherein position compensation is performed and superimposed so that the feature points of images respectively conform to grouping by the group processing;

compensation processing for applying inverse transform filtering and performing hand shake compensation according to the groups of images, which compensates for the blurring direction component corresponding respectively to each grouped composite image generated by the group composite image generation processing; and a compensated image generation processing for generating a hand shake compensated image, wherein position compensation is performed and superimposed so that the feature points of each grouped composite image respectively conform to hand shake compensation by the compensation processing.

* * * * *